United States Patent [19]

Cannon et al.

[11] Patent Number: 6,148,412
[45] Date of Patent: *Nov. 14, 2000

[54] AVAILABILITY AND RECOVERY OF FILES USING COPY STORAGE POOLS

[75] Inventors: David Maxwell Cannon; Michael Allen Kaczmarski; Donald Paul Warren, Jr., all of Tucson, Ariz.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/922,496

[22] Filed: Sep. 3, 1997

Related U.S. Application Data

[63] Continuation of application No. 08/652,042, May 23, 1996, abandoned.

[51] Int. Cl.[7] .......................... H02H 3/05; H03K 19/003
[52] U.S. Cl. ...................... 714/6; 714/2; 714/13
[58] Field of Search .............................. 714/2, 5, 6, 11, 714/13, 15, 41, 42

[56] References Cited

U.S. PATENT DOCUMENTS

| | | | |
|---|---|---|---|
| 4,467,421 | 8/1984 | White | 711/118 |
| 4,601,012 | 7/1986 | Aiken, Jr. | 364/900 |
| 4,853,843 | 8/1989 | Ecklund | 364/200 |
| 5,060,185 | 10/1991 | Naito et al. | 364/900 |
| 5,086,502 | 2/1992 | Malcolm | 395/575 |
| 5,276,867 | 1/1994 | Kenley et al. | 395/600 |
| 5,313,664 | 5/1994 | Sugiyama et al. | 705/21 |
| 5,423,018 | 6/1995 | Dang et al. | 395/425 |
| 5,423,044 | 6/1995 | Sutton et al. | 395/725 |
| 5,475,834 | 12/1995 | Anglin et al | 395/600 |
| 5,537,585 | 7/1996 | Blickenstaff et al. | 707/205 |
| 5,555,371 | 9/1996 | Duyanovich et al. | 714/13 |
| 5,574,906 | 11/1996 | Morris | 395/601 |
| 5,671,350 | 9/1997 | Wood | 714/15 |
| 5,742,792 | 4/1998 | Yanai et al. | 395/489 |
| 5,812,748 | 9/1998 | Ohran et al. | 714/4 |

FOREIGN PATENT DOCUMENTS

| | | | |
|---|---|---|---|
| 2713366 | 6/1995 | France | G06F 12/16 |
| 6370967 | 3/1988 | Japan | G11B 20/10 |
| 1248358 | 10/1989 | Japan | G11B 20/10 |
| 2162437 | 6/1990 | Japan | G06F 12/00 |
| 6161857 | 6/1994 | Japan | G06F 12/00 |

*Primary Examiner*—Dieu-Minh T. Le
*Attorney, Agent, or Firm*—Robert M. Sullivan

[57] ABSTRACT

A data processing system using a client-server configuration provides a method and apparatus for generating and managing multiple copies of client data files. A server coupled to a plurality of client systems organizes sets of storage volumes into storage pools. Primary copies of the client data files are stored in primary storage pools while additional back-up copies of the client data files are copied to secondary storage pools, called copy storage pools. A server database maintains directory information about the original client data file and reference information about the location of the multiple file copies within the server. A storage manager provides a control center within the server, directing and coordinating the transfer of files between the various storage pools, and updating the server database with directory and reference location information.

32 Claims, 5 Drawing Sheets

AVAILABILITY AND RECOVERY OF FILES USING COPY STORAGE POOLS

This application is a continuation of U.S. application, Ser. No. 08/652,042, filed May 23, 1996, now abandoned.

FIELD OF THE INVENTION

The present invention relates generally to storage management within data processing systems, and more particularly, to a method and apparatus for generating and managing multiple copies of client data files within a storage management server system. The storage management server stores primary copies and additional back-up copies of client data files on sets of storage volumes organized into storage pools. Multiple copies of client data files improves the availability and recovery of client data files in the event one of several types of failures occur within the data processing system.

BACKGROUND OF THE INVENTION

Data processing systems typically require a large amount of data storage. Customer data, or data generated by users within the data processing system, occupies a great portion of this data storage. Effective data processing systems also provide back-up copies of this user data to prevent a loss of such data. Many businesses view any loss of data in their data processing systems as catastrophic, severely impacting the success of the business.

Initially, back-up systems simply copied data from DASD to magnetic tape at periodic time intervals, such as a daily or weekly basis. The magnetic tape was then manually moved to a secure storage area, usually located kilometers from the location of the data processing system. This initial back-up method had several shortcomings: retrieval of the back-up copy was time consuming, on the order of hours or even days; all primary files in the data processing system were copied to the back-up media regardless of whether they were updated since the last back-up; and, system performance suffered since files could not be updated during the back-up process. A slight improvement to this initial back-up method periodically transmitted the primary data files to a back-up location. Although this method improved the time to retrieve the back-up data, it still required the primary files to be rewritten each time a back-up occurred and it still prevented further updates to be made to the primary files during the back-up process.

An alternative to these initial back-up methods involves data shadowing, or data mirroring. Dual copy and remote dual copy typically provide this back-up technique. In dual copy, additional storage devices are provided in the data processing system such that an additional copy of the primary data file is written to an additional storage device. Storage devices are coupled together to form duplex pairs, each duplex pair consisting of a primary and secondary storage device. When data is written to the primary storage device, the data processing system automatically copies the data to the secondary storage device. Thus, the secondary storage device is an exact physical image, or mirror, of the primary storage device. With dual copy, a movement of a data file from a first primary storage device to a second primary storage device requires that the back-up copy of the data file also be moved from a first to a second secondary storage device. Because dual copy relies on physical data mirroring, the secondary storage device must be the same physical geometry as the primary storage device, configured and formatted to be an exact replica.

Remote dual copy extends the dual copy methodology to disaster recovery systems. In this configuration, the primary and secondary storage devices are located at different storage subsystem sites remote from each other. The primary and secondary storage devices again form duplex pairs with the secondary storage device mirroring the primary storage device. Again, the primary and secondary storage devices must be the same physical geometry with the secondary storage device configured and formatted to be an exact replica of the primary storage device. Remote dual copy falls into two general categories, synchronous and asynchronous. Synchronous remote dual copy involves sending primary data to the secondary location and confirming the reception of such data before completing the current input/output (I/O) operation. That is, a subsequent I/O operation at the primary site cannot start until the primary data has been successfully copied to the secondary storage device. On the other hand, asynchronous remote dual copy completes the I/O operation to the primary storage device before the data is copied to the secondary storage device. That is, a subsequent I/O operation at the primary site can begin before the primary data from the previous I/O operation has been copied to the secondary site.

Client-server environments have also been developed within data processing systems to serve many purposes. Generally, a client-server configuration includes several clients connected to a single server. The clients create client files and transfer these files to the server. The server receives the client files and stores them on several attached storage devices. When used as a storage management system, the server manages the back-up, archival, and migration of these client files. By storing the client file on an attached storage device, the server creates a back-up copy of the client file. Clients may vary from small personal computer systems to large data processing systems having a host processor connected to several data storage devices. The server can also range from a small personal computer to a large host processor.

Data availability, however, has become such a critical measure of data processing systems that providing only a single copy of the client file within the server system may no longer be sufficient. Several types of errors can occur within the server system to prevent access to the client files. Media failures can damage the client file making it unavailable to the client system. In addition, an entire volume containing several client files may be destroyed within the server system. Finally, a disaster may wipe out the entire server system. All of these failures prevent the client system from accessing the back-up copy provided by the server system. Without an additional back-up copy, the integrity of the server system as protection against the loss of client files becomes inadequate should the server system suffer a catastrophic failure.

To substantially reduce the risk of data loss, server systems typically create a second back-up copy within the server storage subsystem. Some current server systems create an additional back-up by requesting the client system to resend a set of client files. The server then catalogs the second set of client files. While it simplifies the server's duties in maintaining the additional back-up copies, this method poses some disadvantages. The server uses a greater amount of the network resources between the client systems and the server. The client system transfers twice as much data to the server to maintain back-up protection for a single file. In addition, the client system cannot access the original client file while it transfers the file to the server. Thus, requiring the client system to resend the client file to the server doubles the amount of time the file is unavailable to the user in the client system.

Alternatively, some current server systems create an additional back-up by copying the contents of a first storage volume to a second storage volume. The first storage volume contains the initial back-up copies of the client file provided to the server system from the client system. By copying the entire first volume to a second volume, the second volume becomes a duplicate of the first volume and the server system now contains a second back-up copy of the client files. Essentially, the server system is making back-up copies of its primary data files, wherein these primary data files are the primary copies of the client files sent to the server from the client systems.

Making back-up copies on a storage volume boundary creates disadvantages in these current server systems. Device geometries become important when the server system makes its subsequent back-up copies by replicating storage volumes. Creating back-up copies in this manner typically requires identical storage devices for storing the back-up volume. That is, the storage device used for storing the subsequent back-up copies in the server system must be the same type and formatted in the same manner as the storage device which stores the primary copies of the client files. Furthermore, creating subsequent back-up copies in the server system by replicating storage volumes can propagate inefficient use of storage volumes. That is, a first storage volume containing initial client files that is only partially full will be duplicated in a second storage volume. This doubles the amount of unused, and unavailable, space within the server system.

Full volume copying as a means for back-up also creates additional performance inefficiencies in the server. This method often requires the server to duplicate unmodified files from one storage volume to another. For example, a first storage volume containing X files receives an additional file. Full volume copying now requires that all files residing on the first volume, X+1 files, be copied to a second storage volume. Thus, the unchanged files, X files, must be duplicated to make the second storage volume an exact replica of the first storage volume. In addition, files are sometimes moved from one storage volume to another to compress data within the second volume. Full volume copying as a back-up means requires that the second volume must be duplicated once the data compression is complete.

As stated previously, the server system contains a storage subsystem for storing one or more back-up copies of client files. The storage subsystem within the server system need not be limited to a single type of storage device. In fact, server storage subsystems often comprise several different types of storage devices: DASD, optical disk, or magnetic tape. When a server is coupled to different types of storage devices, the storage subsystem is often categorized according to a storage hierarchy. The hierarchy may be based on several factors including: the access speed of the storage device, the density of storage on the device, and the cost of the device per storage unit (i.e. cost per megabyte). A server system containing different storage devices grouped in a storage hierarchy uses a computer application program called a hierarchical storage manager to maintain data files within the storage hierarchy. The storage manager migrates data files between the various levels of the data storage hierarchy using storage management techniques. The storage manager also maintains a reference list, or index, of the data files stored within the server system to assist it in managing the repository of client files within the storage hierarchy.

This storage hierarchy within the server system poses additional problems for servers that generate additional back-up copies by replicating storage volumes. As stated previously, this back-up technique depends on device geometries. Since the additional back-up storage volume is a mirror image of the first storage volume in the server, migrating the primary copy of the client file from one storage device type to a different storage device type within the storage hierarchy necessitates that the back-up copy must also be recopied. That is, full volume copying requires that two storage volumes be replicated for every one file that is migrated within the storage hierarchy. The first storage volume must be duplicates since it now contains one less file. Additionally, the second storage volume must also be duplicated since it contains an additional file. This scenario makes for an inefficient back-up storage management scheme within the storage hierarchy of the server system.

Accordingly, an improved method and apparatus is needed within a data processing system using a client-server configuration for generating and managing additional back-up copies of client files sent from the client systems to the server. Such method and apparatus should incrementally back-up storage volumes within the server storage subsystem instead of replicating the entire storage volume. In an incremental back-up scheme, only the client files from the first storage volume that are new or updated since the previous additional back-up was completed should be copied to the second storage volume. In addition, such method and apparatus should provide direct access to the client system of the additional back-up copy of a requested client file when the primary copy of the file is unavailable within the server storage subsystem. In turn, such method and apparatus should also recover the primary copies of the client files from the additional copies of the files when the server system determines that the storage volume containing the primary copies has been destroyed.

SUMMARY OF THE INVENTION

An object of the present invention is to provide an improved method and apparatus for generating and managing additional back-up copies of client files sent from client systems to a server within a data processing system using a client-server configuration. Such improvement is attained by providing incremental back-up of storage volumes within the server system. Such incremental back-up involves copying only the client files on the primary storage volume that have been added or updated since the previous incremental back-up was completed without duplicating the client files that remain unchanged.

Another object of the present invention is to provide an improved method and apparatus for securing availability and recovery of client files within a data processing system using a client-server configuration by directly accessing an additional back-up copy of the client file when requested by the client system and the primary copy of the file is unavailable.

Another object of the present invention is to provide an improved method and apparatus for managing client files within a data processing system using a client-server configuration by synchronously or a synchronously generating an additional back-up copy of the client file when a primary copy of the file is written from the client system to the server system.

A first embodiment of the present invention includes a data processing system having a plurality of client systems coupled to a server system. The server system contains a storage manager, a database, and a storage subsystem. The storage manager is coupled to both the database and the storage subsystem. The storage subsystem further contains a plurality of storage pools. Each storage pool consists of a set of storage devices of the same type, either DASD, optical disk, or magnetic tape. A first storage pool, a primary storage pool, stores a primary copy of client files. A second storage pool, a copy storage pool, stores an additional back-up copy of client files.

The storage manager controls the transfer of a primary copy of client files from the client system to the primary storage pool within the server. The storage manager also controls the incremental back-up process of copying the newly created, or newly updated, client files in the primary storage pool to the copy storage pool. The storage manager ensures that client files which were unchanged since the previously completed incremental back-up operation are not copied to the copy storage pool in the current incremental back-up operation. The storage manager also maintains a reference list, or index, within the database linking the primary copy of a client file within the primary storage pool to the additional back-up copy of the file within the copy storage pool. Finally, the storage manager automatically generates a back-up copy in the copy storage pool of primary user data files when these files are written or updated in the primary or secondary storage pool.

Another embodiment of the present invention provides a method within a server system for generating and managing multiple copies of user data files within storage pools of the server. For a user data file written from a client system, the method stores a primary copy of the file on a storage volume within a primary storage pool. The method further generates a back-up copy of the user file on a storage volume within a copy storage pool. The method also recovers damaged primary copies of user data files from the back-up copies stored within the copy storage pools. The method also maintains a reference list within a server database which pairs the back-up copies on the copy storage volumes to the primary copy of the user data files on the primary storage volumes.

The foregoing and other objects, features, and advantages of the invention will be apparent from the following more particular description of a preferred embodiment of the invention, as illustrated in the accompanying drawings.

DETAILED DESCRIPTION OF THE INVENTION

Figure 1:
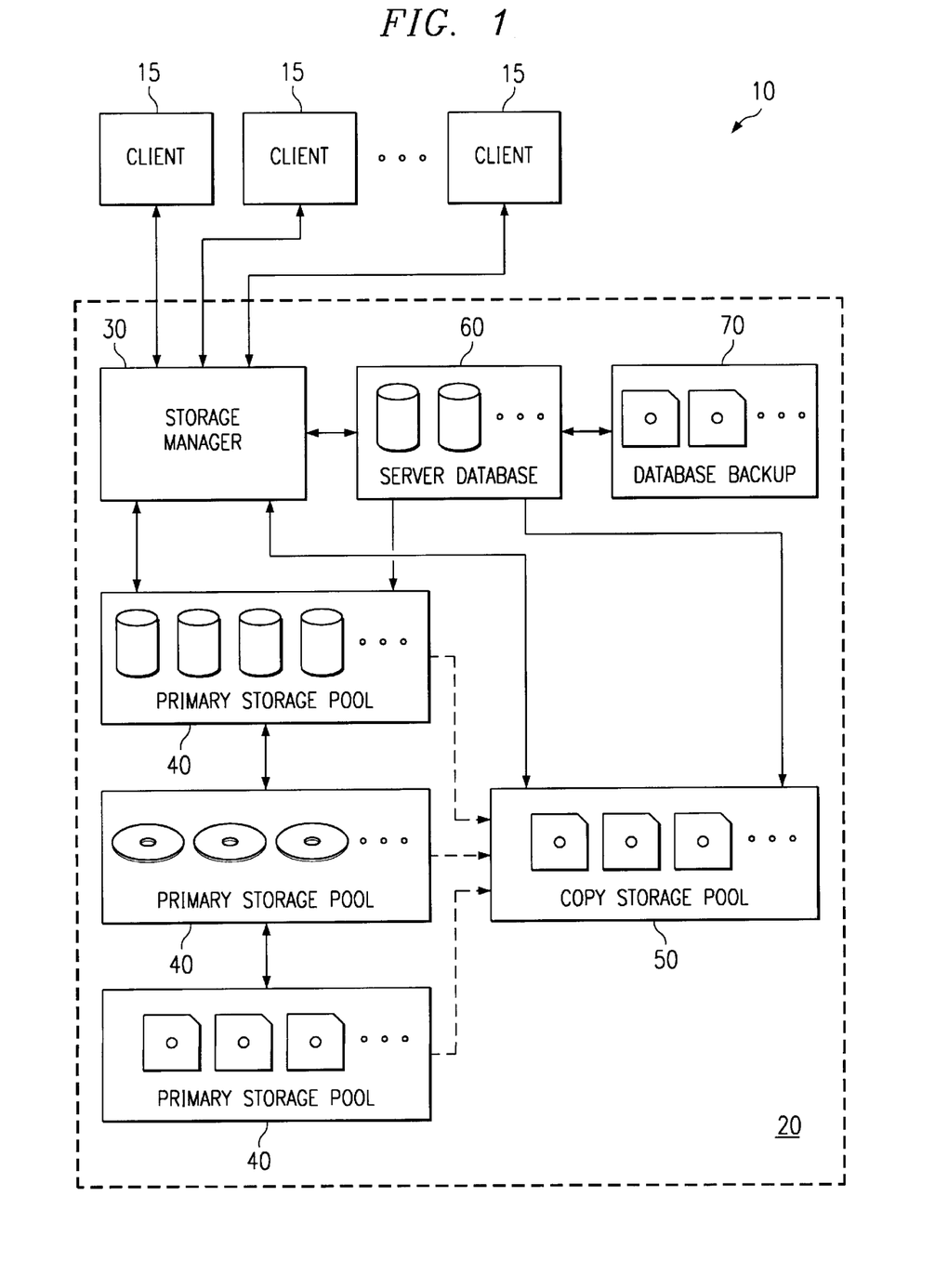
FIG. 1 is a block diagram of a data processing system showing a plurality of client systems coupled to a server system.

Referring more particularly to the drawing, like numerals denote like features and structural elements in the various figures. The invention will be described as embodied in a data processing system using a client-server configuration and providing storage back-up for data recovery and availability. Turning now to FIG. 1, a data processing system 10 is shown having multiple client systems 15 coupled to a server system 20. The server system 20 includes a storage manager 30 coupled to a server database 60. The storage manager 30 is further coupled to a plurality of primary storage pools 40 and a plurality of copy storage pools 50. A storage pool 40, 50 consists of a plurality of storage devices, either DASD, optical disk, or magnetic tape devices. However, all storage devices within a single storage pool 40, 50 are identical in type and format. The server database is further coupled to a set of storage volumes 70 providing a back-up for the server database 60.

Each client system 15 creates original user data files, or client files, which are stored within the corresponding client system 15. The client systems 15 transfer client files to the server system 20. Transferring client files to the server 20 inherently provides a back-up mechanism within the server 20 for these original client files. The storage manager 30 directs the client file to a storage device, or storage volume, within a primary storage pool 40. The primary storage pool 40 stores a primary copy of the client files. The storage manager 30 maintains a catalog within the server database 60 listing the files stored within the storage pools 40, 50 of the server system 20. Once the client file is stored within a primary storage pool 40, the storage manager 30 updates the server database 60 to catalog this file within the server system 20.

The server system 20 also generates an additional back-up copy of the client file and stores this back-up copy on a storage device, or storage volume, within a copy storage pool 50. The storage manager 30 coordinates this operation. Once the additional back-up copy is created within the copy storage pool 50, the storage manager 30 updates the server database 60 to catalog the additional back-up copy of the client file. In addition, the catalog entry within the server database corresponding to the additional back-up copy includes a cross-reference to the primary copy of the client file. Thus, the primary copy in the primary storage pool 40 is linked to the additional back-up copy within the copy storage pool 50. Finally, the server database 60 is backedup to a set of storage volumes 70.

Figure 2:
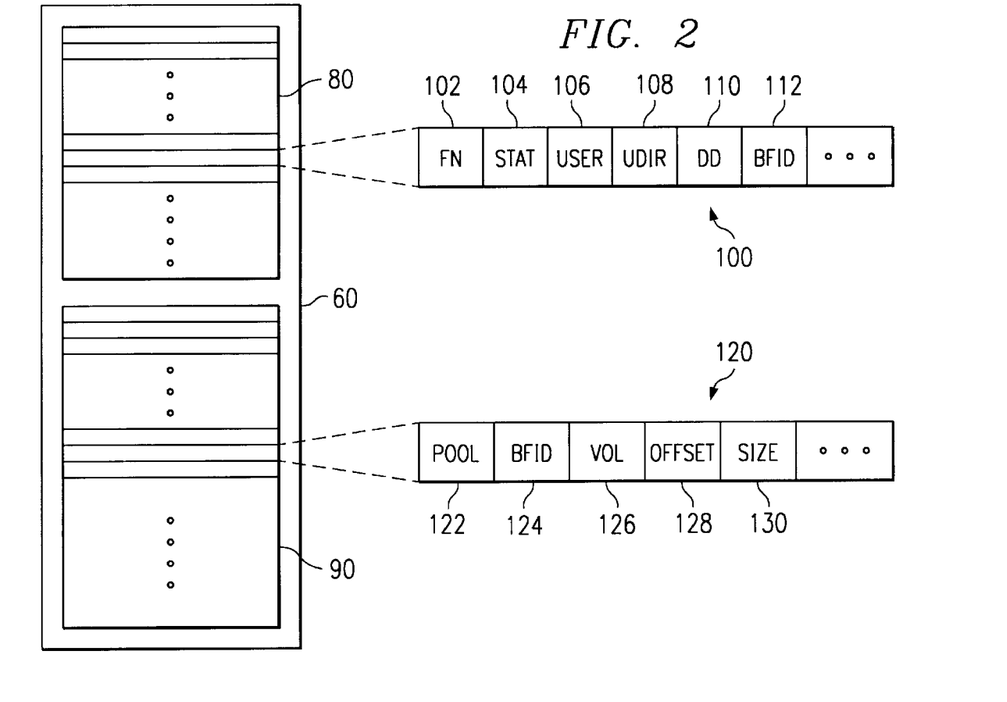
FIG. 2 is a block diagram of the database included in FIG. 1 showing the reference list, or index, which links the primary copy of the client files with their back-up copies.

Referring to FIG. 2, this block diagram shows two portions of the server database 60, a server storage inventory 80 and a server storage reference list 90. The inventory 80 and reference list 90 are used to catalog files stored within the storage pools 40, 50 of the server 20. An entry 100 is expanded to show some of the information contained within the server inventory 80. Likewise, one entry 120 within the reference list 90 is expanded to show some of the information kept within this portion of the server database 60. Each entry 100 within the inventory 80 corresponds to a primary copy of a client file stored within the server 20. Whereas, each entry 120 within the reference list 90 corresponds to any copy of a client file contained within the server 20, either a primary copy in the primary storage pool 40 or an additional back-up copy within the copy storage pool 50. That is, a client file copied multiple times within the server 20 will have a single entry 100 in the server inventory 80, but multiple entries 120 within the reference list 90.

The server inventory entry 100 provides a first field 102 for storing the file name 102 of the client file. A second field 104 is provided to maintain a status indicator 104 for the client file. This status flag 104 indicates whether the file is active or inactive. The storage manager 30 within the server 20 periodically determines, and adjusts, the status 104 of each client file within the server inventory 80. A third field 106 within each server inventory entry 80 lists the user name 106. The user name 106 identifies which client system 15 owns the specified client file. A fourth field 108 provides the directory name 108 within the client system 15 where the corresponding client file originated. A fifth field 110 records the date and time 110 when the primary copy of client file was stored within the server 20.

Finally, a sixth field 112 contains an unique identifier for the primary copy of the client file, denoted the bit-file identifier (bfid) 112. As stated previously, each primary copy of a client file stored within the server system 20 is logged as a separate entry 100 into the server inventory 80. Each entry 100 within the inventory 80 receives a separate, unique bfid 112. Thus, a client system may transfer to the server 20 multiple versions of the same client file at different times. Multiple entries 100 would be kept within the server inventory 80 and each entry would receive a unique bfid 112 corresponding to the distinct time in which the client system 15 transferred the file to the server 20. In addition, an additional back-up copy of the client file may be created and stored in a storage volume within a copy storage pool 50. This back-up copy receives the same bfid 112 as the corresponding primary copy of the client file and is not separately logged into the server inventory 80.

The reference list 90 contains an array of entries 120, one entry 120 for either an initial or additional back-up copy of a client file. Each entry 120 within the reference list 90 specifies where the associated copy of the client file, either a primary copy or an additional back-up copy, is located within the server 20. Each client file copied and stored within the server 20 is identified by a unique bfid 112. The bfid 112 is recorded in a second field 124 within the reference list entry 120. The server 20 storage is organized into storage pools 40, 50, which are simply sets of storage volumes. A file may be located within the server 20 storage by specifying the storage pool, the storage volume within the storage pool, and the offset within the storage volume. Accordingly, a field is provided within the reference list entry for each of these parameters: a storage pool identifier 122, a storage volume identifier 126, and an offset 128 within the storage volume. In addition, a fifth field 130 is provided within the reference list entry 120 to store the size 130 of the file.

The bfid 112 links the reference list 90 with the inventory 80. The inventory 80 contains information about the original client file: the filename 102, the client system name 106, and the directory name 108 within the client system 15 where the original file resides. The reference list 90 contains the location of copies of the client file, initial and back-up, within the server 20 storage: the storage pool 122, the storage volume 126 within the storage pool, and the offset 128 on the storage volume. Each inventory entry 100 and reference list entry 120 contains the bfid 112, 124 for the file copy. Besides providing each copy of a client file with a unique identifier, the bfid 112 also maps the information within the inventory 80 to the reference list 90.

Figure 3:
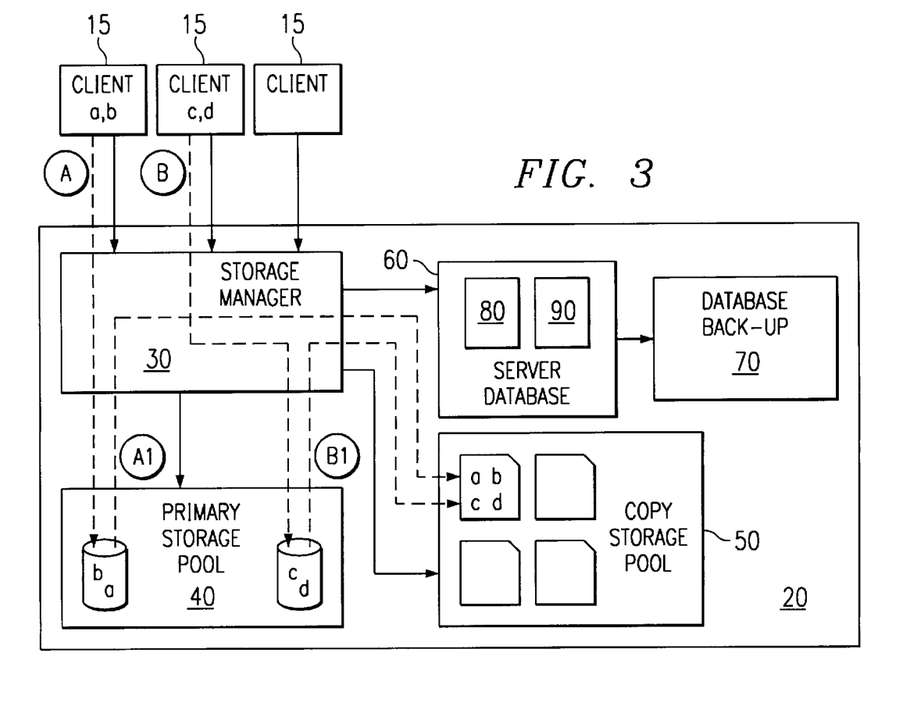
FIG. 3 is a block diagram showing the server system in FIG. 1 generating a back-up copy of a user data file.

Referring to FIG. 3, this figure shows an example of an automatic generation of an additional back-up copy of client files within the server 20. Multiple client systems 15 are coupled to a server 20 having a storage manager 30, a primary storage pool 40, a copy storage pool 50, a server database 60, and a database back-up storage 70. Four data transfers A, B, A1, B1 are shown with dashed lines in the figure. In data transfer A, one client system 15 sends two client files a, b to the server 20. The storage manager 30 directs these files a, b to a storage device within the primary storage pool 40. The server database 60 is also updated to add the primary copies of files a, b to the inventory 80 and the reference list 90. A unique bfid 112 is assigned to the primary copies of the client files a, b stored within the primary storage pool 40. In data transfer A1, the server 20 generates an additional back-up copy of each client file a, b in a storage volume within a copy storage pool 50. The storage manager 30 coordinates the transfer between the primary 40 and copy 50 storage pools.

The database 60 is again updated to add the back-up copies of the client files a, b stored within the copy storage pool 50. A bfid 112 is assigned to these back-up copies, the same bfid 112 as was given to the primary copies of the client files a, b.

Likewise, initial and back-up copies of client files c, d are stored within the server in data transfers B, B1. The storage manager 30 controls the data transfer to the primary 40 and copy 50 storage pools. The database 60 is again updated to add the primary copies and back-up copies of client files c, d. Also, each primary copy receives a separate bfid 112 linking the inventory 80 information to the reference list 90. In sum, the server inventory 80 has added four entries 100, one for each primary copy of client files a, b, c, d, and the reference list 90 has increased by eight entries 120, one for each primary and back-up copy of the client files a, b, c, d. In addition, four new bfids 112 have been created from these four data transfers A, B, A1, B1. These examples point out the device geometry independence of the current invention. The additional back-up copies need not be stored on the same storage device type on which the primary copies reside. Also, if the primary copies should be migrated within a storage hierarchy in the server 20, the back-up copies can remain in their current location. Furthermore, the inventory 80 and reference list 90 entries within the server database 60 for the back-up copies need not be updated.

The server 20 can generate additional back-up copies of client files either synchronously or asynchronously. For synchronous back-up generation, the additional back-up copies must be copied to a copy storage pool 50 before the server 20 signals to the client system 15 that the primary copy operation is complete. That is, the primary copy of the client file must be stored in the primary storage pool 40 and the back-up copy must be stored in the copy storage pool 50 before the server 20 signals transfer complete to the requesting client system 15. For asynchronous back-up copying, the server 20 signals transfer complete to the requesting client system 15 once the primary copy of the client file is stored in a primary storage pool 40. The server 20 then subsequently generates an additional back-up copy in a copy storage pool 50 from the primary copy in a primary storage pool 40.

Figure 4:
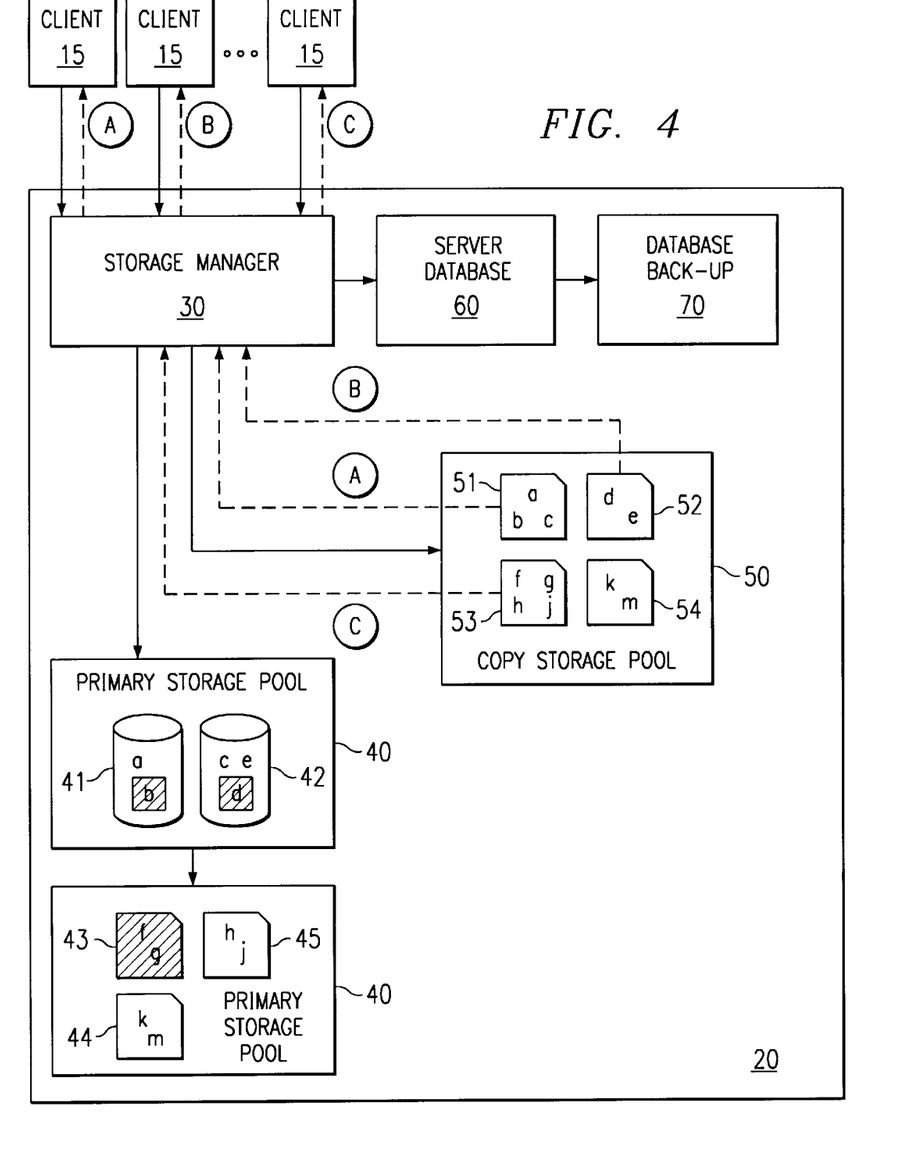
FIG. 4 is a block diagram showing the server system in FIG. 1 providing direct access to an additional back-up copy of a client file when the primary copy of the file is unavailable.

FIG. 4 shows an example of the server 20 recovering unavailable primary copies of client files from back-up copies of the files stored within a copy storage pool 50. As depicted in FIG. 1, multiple client systems 15 are coupled to a server system 20 having a storage manager 30, a primary storage pool 40, a copy storage pool 50, a server database 60, and a database back-up storage 70. A first primary storage pool 40 contains DASD storage volumes 41, 42 while a second primary storage pool 40 contains magnetic tape storage volumes 43, 44, 45. Three data transfers A, B, C are shown with dashed lines in the figure, each depicting the server 20 sending the back-up copy of a requested client file b, d, f, g when the primary copy is unavailable. In scenarios A and B, the storage manager 30 uses the server database 60 to determine that the primary copies of the requested client files b, d are damaged on storage volumes 41, 42. The storage manager 30 then queries the database 60 to locate the back-up copies of the client files b, d within the copy storage pool 50. The storage manager 30 finally coordinates the data transfer of the client files b, d to the respective client systems 15 directly from the storage volumes 51, 52 within the copy storage pool 50.

In scenario C, a destroyed storage volume 43 holds the primary copies of the requested client files f, g. The storage manager 30 again uses the database 60 to determine that the primary copies are unavailable and to locate the back-up copies of the files f, g on the storage volume 53 within the copy storage pool 50. The storage manager 50 coordinates the transfer of files f, g to the client system 15 directly from the storage volume 53 within the copy storage pool 50.

Figures 5A, 5B:
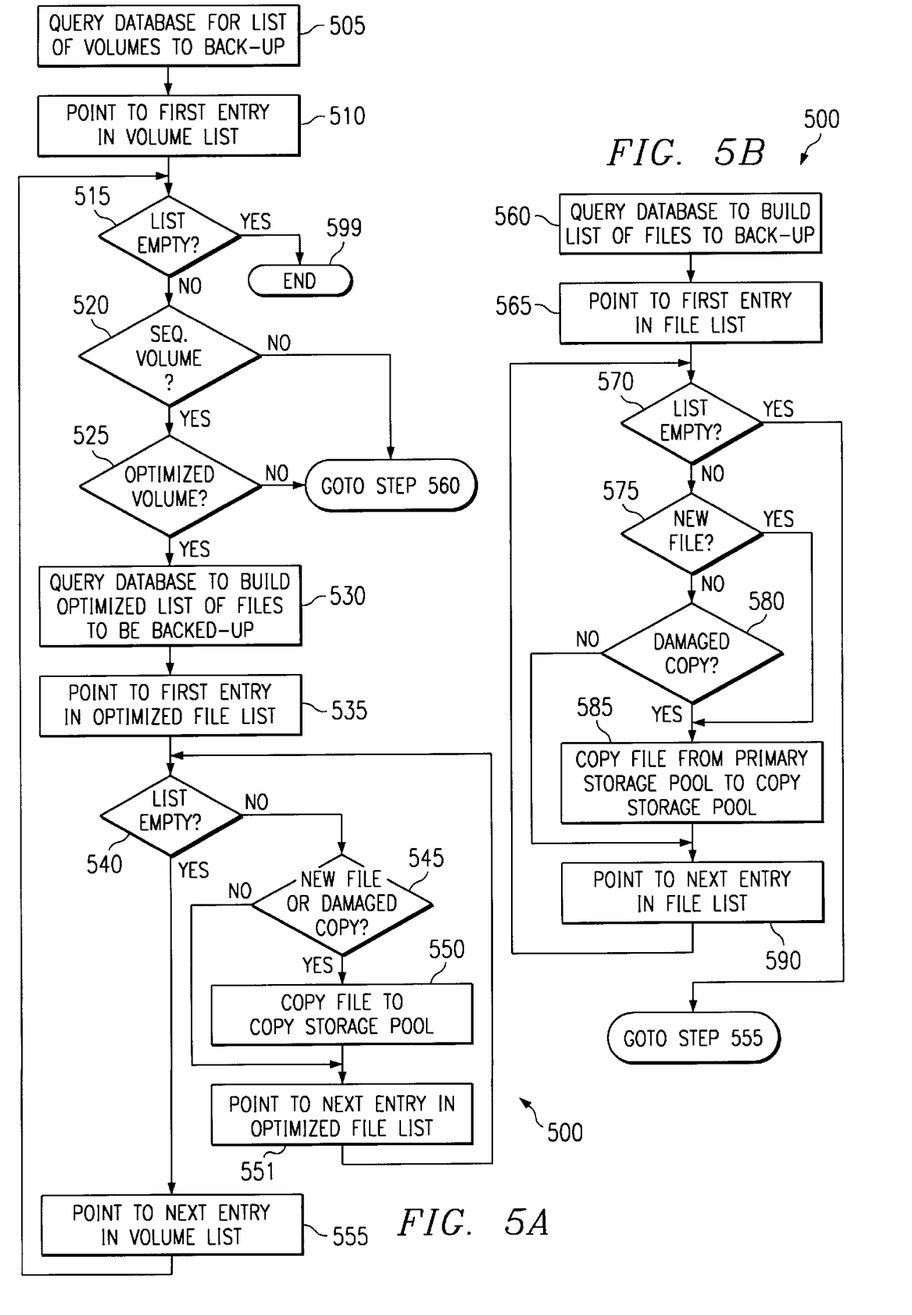
FIGS. 5A and 5B contain a flow diagram of a method for the server system in FIG. 1 providing incremental back-up of a first storage volume within a primary storage pool to a second storage volume within the copy storage pool.

FIGS. 5A and 5B show a flow diagram describing a method 500 within the server 20 for providing an incremental back-up operation from a primary storage pool 40 to a copy storage pool 50. Incremental back-up occurs when the server 20 generates an additional back-up copy of only those files within a storage volume 41 of a primary storage pool 40 that have changed or been added since the most recent periodic back-up of the storage volume 41. The server 20 performs this operation in response to either a direct command from a client system 15 or a determination made by the storage manager 30. FIG. 5A describes a back-up procedure for an optimized, sequential storage volume 43 within a primary storage pool 40. An optimized storage volume is defined as a primary storage volume 41–45 in which the database 60 has maintained a pointer to the file on the storage volume that has been previously backed-up to a copy storage volume 51–54. Conversely, FIG. 5B outlines a back-up operation taken for non-sequential 41 or unoptimized sequential 44 storage volumes within a primary storage pool 40.

Referring particularly to FIG. 5A, the server database 60 is searched to build a list of storage volumes 41–45 from the primary storage pools 40 which contain files to be copied to storage volumes 51–54 within the copy storage pools 50. A step 505 is provided to build such a volume list. At step 510, the method 500 points to the first entry within the volume list. This entry contains a subset of the information maintained within the server database 60 pertaining to a particular storage volume 41 within a primary storage pool 40. At step 515, the volume list is checked to determine if all entries within it have been processed. If the end of the volume list has been reached, the method ends at step 599. Otherwise, the current volume list entry is checked to determine if the corresponding primary storage volume 41–45 is a sequential volume. If it is a sequential volume, step 525 further checks to determine if the corresponding volume has also been optimized. If either inquiry in steps 520 and 525 return a negative response, the method continues at step 560 in FIG. 5B.

Referring now to FIG. 5B, a step 560 is provided to query the server database 60 to build a list of files to be copied from a storage volume 41 within a primary storage pool 40 to a copy storage pool 50. As stated previously, the server database 60 maintains a bfid 112 for each client file, a storage volume identifier for each storage volume, and a storage pool identifier 122 for each primary 40 or copy 50 storage pool. Step 560 first searches the database 60 for all client files residing on the specified primary storage volume 41. The bfids 112 of these client files are then combined with the storage pool identifier 122 of the copy storage pool 50 to find matched entries within the database 60. The client files that are not located within the copy storage pool 50, where no matched entry is found in the database 60, are added to the list. At step 565, the method 500 points to the first entry within the newly built file list. At step 570, the file list is checked to determine if the current entry indicates that the end of the list has been reached. If the end of the list has been reached, the method 500 continues to step 555 in FIG. 5A. Otherwise, the current entry in the file list is checked to determine if it represents a new file at step 575. That is, a primary copy of the client file was created on the primary storage volume 41 that has not been backed-up to the copy storage pool 50.

If the current entry does not represent a new file, step 580 checks to see if the current entry represents a file on a primary storage volume 41 with a corresponding damaged copy on a storage volume 51 within a copy storage pool 50. If either inquiry brings about an affirmative response, the primary copy of the client file is copied from the primary storage volume 41 to a copy storage volume 51 at step 585. Otherwise, the method 500 proceeds directly to step 590. At step 590, the next entry within the file list is selected. Control then returns to step 570 if no entries remain to be processed within the file list.

Referring again to FIG. 5A, the incremental back-up method for optimized, sequential volumes is described. As stated previously, an optimized storage volume is defined as a primary storage volume 41–45 in which the database 60 has maintained a pointer to the file on the storage volume that has been previously backed-up to a copy storage volume 51–54. At step 530, the server database 60 is searched to build a list of files to be copied from the optimized primary storage volume 43 to a copy storage volume 51–54 within a copy storage pool 50. This list consists of an entry for each file on the primary storage volume 43 positioned after the pointer. At step 535, the method 500 points to the first entry within the newly built file list. At step 540, the file list is checked to determine if the end of the list has been reached. If the end of the file list has been reached, step 555 points to the next entry in the storage volume list and returns to step 515 to check if the volume list is empty. Otherwise, step 545 checks whether the current entry corresponds to a new file on the primary storage volume 43 or to a file that has a damaged back-up copy in the copy storage pool 50. If not, the method 500 continues to step 551. Otherwise, step 550 copies the file from the optimized primary storage volume 43 to the copy storage pool 50. At step 551, the next entry within the file list is accessed. In addition, step 551 updates the pointer within the server database 60 to point to the file just copied to the copy storage volume 50.

An example is presented to illustrate the advantage of an optimized primary storage volume. At time t, files a, b, and c were backed up from primary storage volume A to copy storage volume D. In the server database 60, file c was recorded as the last file backed-up on storage volume A. At time t+1, files d and e, primary copies of client files new to the server 20, are added to storage volume A. At time t+2, the server 20 begins an incremental back-up operation involving storage volume A. Since storage volume A is optimized, the database query is shortened. Only the files stored on the sequential storage volume A after file c need to be included in the optimized file list built from the database 60 query. Files a, b, and c, each with its unique bfid 112, need not be searched in the database 60 query.

In the case of non-sequential 41 or unoptimized sequential storage volume 44, each file stored on the volume would be searched in the database 60 according to its distinct bfid 112. According to the previous example, the database 60 query would be lengthened in that information for files a, b, and c would be searched. Moreover, the search of these additional database records for files a, b, and c would reveal that each of these files already had a valid back-up copy within the copy storage pool 50.

Figures 6A, 6B:
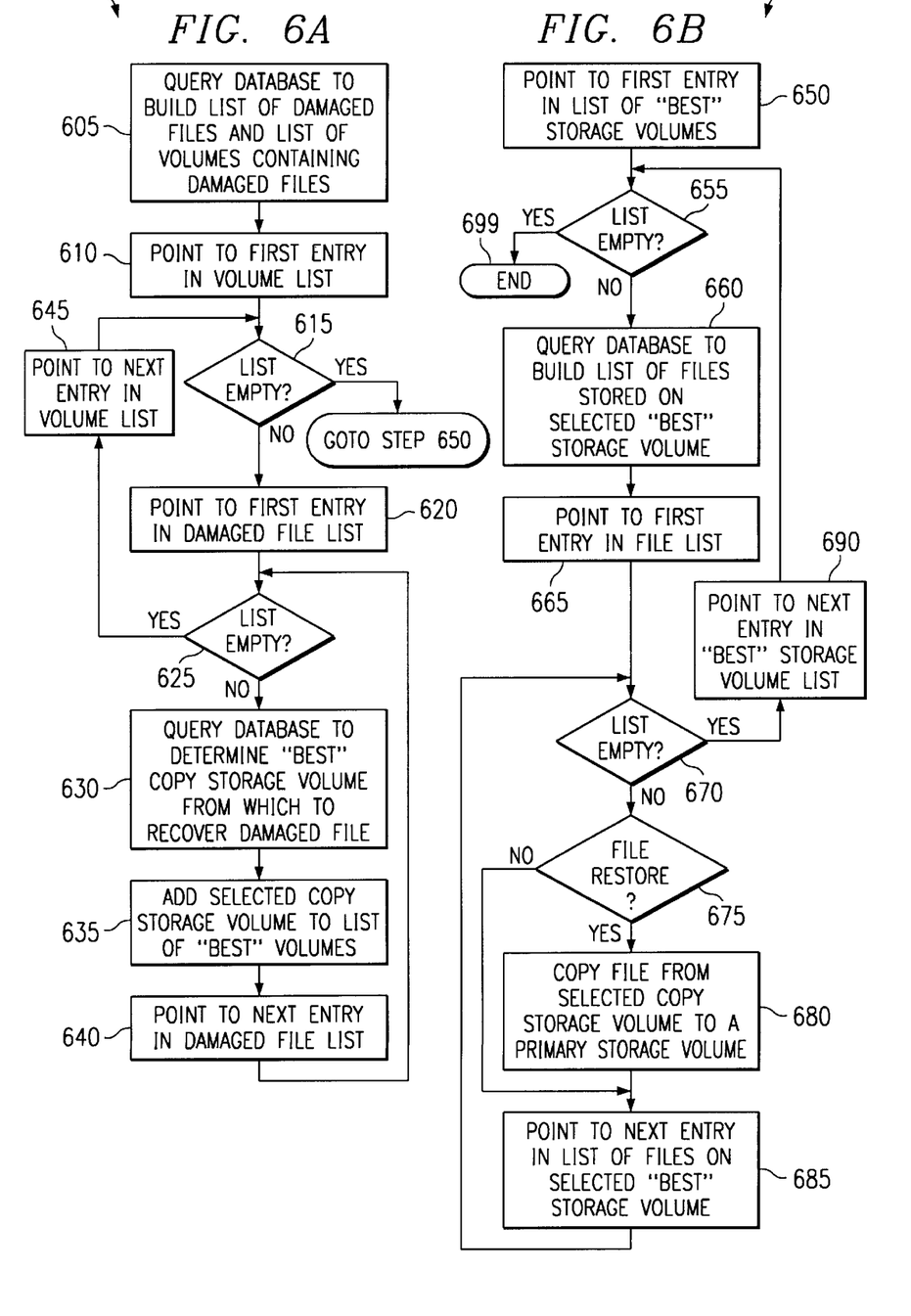
FIGS. 6A and 6B show a flow diagram of a method for the server system in FIG. 1 recovering a primary copy of a client file from the additional back-up copy of the file.

Referring now to FIGS. 6A and 6B, a flow diagram describes a method 600 for recovering, or restoring, an unavailable primary copy of a client file stored on a primary storage volume 41–45 from a back-up copy of the file stored on a copy storage volume 51–54. FIG. 6A shows the steps for first building a list consisting of damaged files or files stored on destroyed storage volumes in the primary storage pools 40 and then subsequently building a list of "best" storage volumes from the copy storage pools 50 corresponding to these files. "Best" storage volumes can be measured by several parameters. Typically, a best storage volume is one where its files can be easily and quickly accessed relative to other volumes. That is, the storage volume is mounted, or if unmounted, is quicker to mount. FIG. 6B uses the list of "best" copy storage volumes to locate the back-up copies of files to be recovered and to restore the corresponding primary copies of the files in the primary storage volumes 41–45.

Referring particularly to FIG. 6A, step 605 queries the server database 60 to uncover damaged files within the primary storage pools 41–45. A list of these files is built within the database 60, each entry into the list corresponding to a damaged file and referenced by its distinct bfid 112. Additionally, a list of the primary storage volumes 41–45 containing these damaged files is also built. A step 610 points to the first entry in the list of primary volumes containing damaged files. At step 615, a check is made to determine the method 600 has reached the end of the list of volumes. If so, the method 600 continues to step 650 in FIG. 6B. Otherwise, a step 620 points to the first entry in the damaged file list.

At step 625, a check is made to verify that the end of the file list has not been reached. If the end of the list is reached, step 645 points to the next entry in the list of primary storage volumes 41–45 containing damaged files and the method 600 returns to step 615. Otherwise, the end of the file list has not been reached and step 630 queries the database 60 to select the "best" storage volume within the copy storage pools 50 from which to recover the respective damaged file. As stated previously, several factors may determine which copy storage volume 51–54 fits the "best" label, such as storage volume location, storage volume availability, and mount status and time. A step 635 adds the selected copy storage volume 51–54 to a list of best storage volumes, provided the volume is not previously included in the list. A step 640 points to the next entry in the damaged file list and returns to step 625 to check if the end of the file list has been reached.

Referring now to FIG. 6B, a step 650 points to the first entry in the list of best copy storage volumes 51–54 from which to recover damaged files to the primary storage volumes 41–45. A step 655 checks for whether the method 600 has reached the end of the list of best copy storage volumes 51–54. If not, step 660 queries the server database 60 to build a list of the files stored on the selected copy storage volume 51–54. Each entry in this file list contains information about a back-up file stored on the selected copy storage volume 51–54 including the file's distinct bfid 112.

A step 665 points to the first entry in this file list. A step 670 verifies that the end of the file list has not been reached. If the end of the file list has been reached, step 690 points to the next entry in the list of best copy storage volumes and returns to step 655.

Otherwise, the end of the file list pertaining to the selected best copy storage volume has not been reached. A step 675 checks the entry to determine if the back-up file corresponds to a damaged primary copy on a primary storage volume 41–45. Not all back-up files stored on the best copy storage volume will need to be copied to their respective primary copies in a primary storage volume 41–45. This method 600 copies only those back-up files that are paired with a damaged file or a file located on a destroyed primary storage volume. At step 680, the back-up file on the copy storage volume 51–54 is copied to a primary storage volume 41–45 replacing the previous primary copy of the client file. The server database 60 is updated to reflect the new location of the primary copy of the file, the new time stamp, the file status, and the back-up copies in the copy storage pools 50 pertaining to this new primary copy are now cross-referenced to the new primary storage location 40.

A step 685 points to the next entry within the list of files stored on the selected "best" copy storage volume. Once the next entry is selected, the method 600 returns to step 670 to determine if the end of the file list has been reached. Finally, step 699 signals that the recovery has been completed, the damaged files on the primary storage volumes 41–45 have been recovered from the back-up files on the copy storage volumes 51–54.

Figure 7:
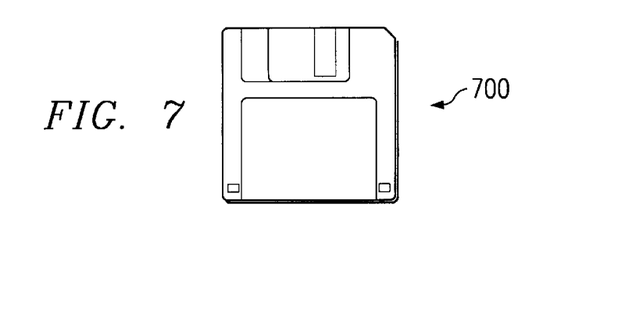
FIG. 7 is a block diagram representing a storage medium or memory for storing computer executable instructions.

FIG. 7 depicts a storage medium 700 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

While the invention has been particularly shown and described with reference to preferred embodiments thereof, it will be understood by those skilled in the art that various changes in form and details may be made therein without departing from the spirit and scope of the invention. For example, the client systems and the server system have been shown in the figures as separate hardware systems. However, within the scope of the present invention, the client systems and the server system could be separate software applications running under the same data processing system. In addition, the server may contain multiple copy storage pools. The primary copy of a client data file has a back-up copy in one copy storage pool, but may also have an additional back-up copy in an additional copy storage pool. Further, copy storage volumes are not meant to be limited to magnetic tape, but may comprise other storage media, such as DASD or optical disk. Likewise, primary storage volumes may also comprise any storage media, and are not limited to the types of media represented in the figures.

What is claimed is:

1. In a data processing system having a plurality of client systems generating client data files, a server coupled to said plurality of client systems for generating and managing multiple copies of said client data files, said server comprising:

a first storage pool having a plurality of primary storage volumes for storing a primary copy of said client data files;

a second storage pool having a plurality of copy storage volumes for storing a back-up copy of said client data files;

a server database for maintaining directory information and reference location information linking said primary copy and said back-up copy of said client data files; and a storage manager coupled to said first storage pool, said second storage pool, and said server database, said storage manager receiving said primary copy of said client data file from said client system and storing said primary copy of said client data file in said primary storage volume, said storage manager further generating said back-up copy of said client data file by copying said primary copy of said client data file from said primary storage volume to said copy storage volume, said storage manager updating said directory information and said reference location information in said server data base to link said primary copy and said back-up copy, said storage manager transferring said primary copy to said client system in response to a client system request for said client data file, said storage manager also periodically performing an incremental back-up operation from said first storage pool to said second storage pool such that a set of selected primary copies of client data files is copied to said copy storage volumes, wherein in response to said client system request for said client data file, said storage manager determining that said primary copy of said client data file is unavailable, said storage manager then directly accessing said back-up copy of said client data file by using said directory information and said reference location information in said server database and transferring said back-up copy from said copy storage volume to said requesting client system, said storage manager then subsequently recovering said unavailable primary copy of said client data file by copying said back-up copy from said copy storage volume to said primary storage volume.

2. The server in claim 1 further comprising:

a first list in said server database identifying said primary copies of said client data files to be copied from said first storage pool to said second storage pool during said incremental back-up operation, wherein said storage manager queries said directory information and said reference location information in said server database to build said first list.

3. The server in claim 2 wherein said first list identifies said primary copies of client data files stored in said first storage pool at a time subsequent to when a previous incremental back-up operation was most recently completed.

4. The server in claim 3 wherein said first list further identifies said primary copies of client data files stored in said first storage pool having corresponding damaged back-up copies in said second storage pool.

5. The server in claim 1 further comprising:

a second list in said server database identifying said unavailable primary copy of said client data files, a best back-up copy of said unavailable primary copy, and said copy storage volume containing said best back-up copy, wherein said storage manager searches said reference location information in said server database to find said unavailable primary copy, said storage manager further determines said best back-up copy according to which said back-up copy in said second storage pool is most easily accessible to said storage manager.

6. The server in claim 5 wherein for each said copy storage volume identified in said second list, said storage manager copies said best back-up copy from said copy storage volume to said primary storage volume to recover said unavailable primary copy.

7. The server in claim 6 wherein said unavailable primary copy of said client data file is damaged or destroyed in said first storage pool.

8. The server in claim 1 wherein said storage manager synchronously generates said back-up copy of said client data file on said copy storage volume immediately after storing said primary copy of said client data file on said primary storage volume.

9. The server in claim 1 wherein said directory information in said server database for each said primary copy and each said back-up copy of said client data file further comprises:

a file name;
a client system identifier;
a file status word;
a time stamp; and
a bit-file identifier (bfid).

10. The server in claim 1 wherein said reference location information in said server database for each said primary copy and each said back-up copy of said client data file further comprises:

a storage pool identifier;
a storage volume identifier;
a storage volume offset;
a file size; and
a bit-file identifier (bfid).

11. The server in claim 1 further comprising a third storage pool coupled to said storage manager, said third storage pool for storing a back-up copy of said server database.

12. The server in claim 1 wherein said primary storage volumes are direct access storage devices (DASDs).

13. The server in claim 1 wherein said primary storage volumes are magnetic tape cartridges.

14. The server in claim 1 wherein said primary storage volumes are optical disks.

15. The server in claim 1 wherein said copy storage volumes are magnetic tape cartridges.

16. The server in claim 1 wherein said copy storage volumes are optical disks.

17. In a data processing system having a plurality of client systems generating client data files, and a server coupled to said plurality of client systems, a method in said server for generating and managing multiple copies of said client data files comprising steps of:

receiving said client data file from said client system, and storing a primary copy of said client data file in a first storage pool, said first storage pool having a plurality of primary storage volumes;

generating a back-up copy of said client data file by copying said primary copy to a second storage pool, said second storage pool having a plurality of copy storage volumes;

maintaining directory information and reference location information in a server database to link said primary copy stored in said primary storage volume and said back-up copy stored in said copy storage volume;

in response to a client system request for said client data file which is determined to have an available primary copy, transferring said available primary copy from said primary storage volume to said requesting client system; and in response to a client system request for said client data file which is determined to have an unavailable primary copy, accessing said back-up copy of said client data file using said directory information and said reference location information in said server database, transferring said back-up copy of said client data file directly from said copy storage volume to said requesting client system, and then subsequently recovering said unavailable primary copy of said client data file by copying said back-up copy from said copy storage volume to said primary storage volume.

18. The method of claim 17 further comprising:
periodically performing an incremental back-up operation from said first storage pool to said second storage pool by selecting a set of primary copies of client data files stored on said primary storage volumes, and copying said selected primary copies from said primary storage volumes to said copy storage volumes.

19. The method of claim 18 wherein said selecting step further comprises:
querying said directory information and said reference location information in said server database to build a first list identifying said set of primary copies.

20. The method of claim 19 wherein said first list identifies said primary copies stored in said first storage pool at a time subsequent to when a previous incremental back-up operation was most recently completed.

21. The method of claim 20 wherein said first list further identifies said primary copies stored in said first storage pool having corresponding damaged back-up copies in said second storage pool.

22. The method of claim 19 further comprising steps of:
maintaining a second list in said server database, said second list identifying a sequence of ordered primary copies of said client data files on a sequential primary storage volume, said sequence of ordered primary copies having been copied as said back-up copies to said second storage pool during a previous incremental back-up operation.

23. The method of claim 22 wherein said first list identifies said primary copies positioned on said sequential primary storage volume after said sequence of ordered primary copies.

24. The method of claim 17 wherein said recovering step further comprises:
searching said reference location information in said server database to find said unavailable primary copy of said client data file;
determining a best back-up copy of said client data file corresponding to said unavailable primary copy;
building a third list in said server database identifying said copy storage volume containing said best back-up copy such that said copy storage volume is entered in said third list only if said copy storage volume was previously entered; and
for each said copy storage volume identified in said third list, copying each said best back-up copy of said client data file stored therein to said primary storage volume.

25. The method of claim 24 wherein said best back-up copy is located on said copy storage volume that is currently most easily accessible in said server.

26. The method of claim 24 wherein said unavailable primary copy of said client data file is damaged or destroyed in said first storage pool.

27. The method of claim 17 wherein said generating step is accomplished synchronously within the server.

28. The method of claim 17 wherein said directory information in said server database for each said primary copy and each said back-up copy of said client data file further comprises:
a file name;
a client system identifier;
a file status word;
a time stamp; and
a bit-file identifier (bfid).

29. The method of claim 17 wherein said reference location information in said server database for each said primary copy and each said back-up copy of said client data file further comprises:
a storage pool identifier;
a storage volume identifier;
a storage volume offset;
a file size; and
a bit-file identifier (bfid).

30. An article of manufacture for use in a data processing system having a plurality of client systems generating client data files, and a server coupled to said plurality of client systems for generating and managing multiple copies of said client data files,
said article of manufacture comprising a computer-readable storage medium tangibly embodying a program of executable computer instructions which may cause said server to execute steps comprising:
receiving said client data file from said client system and storing a primary copy of said client data file in a first storage pool, said first storage pool having a plurality of primary storage volumes;
generating a back-up copy of said client data file by copying said primary copy to a second storage pool, said second storage pool having a plurality of copy storage volumes;
maintaining directory information and reference location information in a server database to link said primary copy stored in said primary storage volume and said back-up copy stored in said copy storage volume;
periodically performing an incremental back-up operation from said first storage pool to said second storage pool by selecting a set of primary copies of said client data files stored in said primary storage volumes and copying said selected primary copies from said primary storage volumes to said copy storage volumes;
in response to a client system request for a client system data file which is determined to have an available primary copy, transferring said available primary copy from said primary storage volume to said requesting client system; and
in response to a client system request for said client data file which is determined to have an unavailable primary copy, accessing said back-up copy of said client data file using said directory information and said reference location information in said server database, transferring said back-up copy of said client data file directly from said copy storage volume to said requesting client system, and then subsequently recovering said unavailable primary copy of said client data file by copying said back-up copy from said copy storage volume to said primary storage volume.

31. The article of manufacture of claim 30 wherein said program of executable computer instructions may cause said server to execute steps further comprising:

querying said directory information and said reference location information to build a first list in said server database, said first list identifying said set of primary copies; and maintaining a second list in said server database, said second list identifying a sequence of ordered primary copies of said client data files on a sequential primary storage volume, said sequence of ordered primary copies having been copied as said back-up copies to said second storage pool during a previous incremental back-up operation.

32. The article of manufacture of claim 30 wherein said program of executable computer instructions may cause said server to execute steps further comprising:

searching said reference location information in said server database to collect entries corresponding to said back-up copies linked to said unavailable primary copy of said client data file;

determining a best back-up copy of said unavailable primary copy from said collected entries of said reference location information;

building a third list in said server database identifying said copy storage volume storing said best back-up copy of said unavailable primary copy; and for each said copy storage volume identified in said third list, copying said best back-up copy of said unavailable primary copy stored therein to said primary storage volume.

* * * * *